United States Patent
Madhavan et al.

(10) Patent No.: US 12,314,433 B2
(45) Date of Patent: May 27, 2025

(54) SYSTEMS FOR DESIGN AND IMPLEMENTATION OF PRIVACY PRESERVING AI WITH PRIVACY REGULATIONS WITHIN INTELLIGENCE PIPELINES

(71) Applicant: Oracle International Corporation, Redwood Shores, CA (US)

(72) Inventors: Rajan Madhavan, Foster City, CA (US); Madalasa Venkataraman, Bengaluru (IN); Girish Nautiya, Redwood Shores, CA (US); Dinesh Ghanta, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 252 days.

(21) Appl. No.: 17/932,938

(22) Filed: Sep. 16, 2022

(65) Prior Publication Data

US 2024/0095394 A1    Mar. 21, 2024

(51) Int. Cl.
*G06F 21/62*    (2013.01)
*G06N 20/00*    (2019.01)

(52) U.S. Cl.
CPC ......... *G06F 21/6245* (2013.01); *G06N 20/00* (2019.01)

(58) Field of Classification Search
CPC .. G06F 21/6245; G06F 21/6254; G06N 20/00
See application file for complete search history.

(56) References Cited

U.S. PATENT DOCUMENTS

| | | | |
|---|---|---|---|
| 7,823,207 B2 | 10/2010 | Evenhaim | |
| 8,468,244 B2 * | 6/2013 | Redlich | G06Q 50/18 715/255 |
| 11,256,809 B2 | 2/2022 | Knox et al. | |
| 11,315,041 B1 * | 4/2022 | Jain | G06N 20/20 |
| 12,061,722 B1 * | 8/2024 | Pena | G06F 21/577 |

(Continued)

FOREIGN PATENT DOCUMENTS

WO    2022169447 A1    8/2022

OTHER PUBLICATIONS

International Search Report and Written Opinion for PCT Patent Application No. PCT/US2023/031562 dated Dec. 4, 2023.

(Continued)

*Primary Examiner* — Benjamin E Lanier
*Assistant Examiner* — Lydia L Noel
(74) *Attorney, Agent, or Firm* — MUGHAL GAUDRY & FRANKLIN PC

(57) ABSTRACT

Data can be received that includes information corresponding to a set of users. Privacy protection protocols that apply to the data can be identified. A subset of the data can be identified as being personally identifiable information (PII) data, where the subset includes a set of PII attributes. The PII attributes can be split into categories based on a format of a data field in the PII attributes. The processed PII data can be combined with non-PII data to create processed client data. It can be determined to add noise to part of the processed PII data. An amount of noise can be determined based on the privacy protection protocols. The amount of noise can be added to part of the processed PII data to produce protected data. A machine-learning model can be trained using the protected data.

15 Claims, 11 Drawing Sheets

(56) References Cited

U.S. PATENT DOCUMENTS

| | | | | |
|---|---|---|---|---|
| 2009/0172408 | A1* | 7/2009 | Cheng | G06F 21/84 |
| | | | | 726/1 |
| 2020/0244707 | A1* | 7/2020 | Silver | G06N 3/045 |
| 2021/0216902 | A1* | 7/2021 | Sutcher-Shepard | G06N 20/00 |
| 2021/0374605 | A1 | 12/2021 | Qian et al. | |
| 2022/0147654 | A1* | 5/2022 | Beach | G06F 21/6254 |
| 2022/0171873 | A1 | 6/2022 | Lundbaek | |
| 2022/0300651 | A1* | 9/2022 | Mondal | G06F 21/6254 |

OTHER PUBLICATIONS

Ullah, I. et al., "Privacy in Targeted Advertising: A Survey", Arxiv.org, Cornell University Library, Jun. 20, 2021.

Bhatt, "Privacy-Preserving in Machine Learning (PPML)", Analytics Vidhya, Feb. 3, 2022, 18 pages.

Bosri et al., "Integrating Blockchain with Artificial Intelligence for Privacy-Preserving in Recommender Systems", Journal of IEEE Transactions on Network Science and Engineering, Aug. 2020, 13 pages.

Koo et al., "Security and Privacy in Big Data Life Cycle: A Survey and Open Challenges", MDPI, Sustainability, Dec. 17, 2020, 33 pages.

Perino et al., "Privacy-Preserving AI for Future Networks", Communications of the ACM, vol. 65, No. 4, Apr. 2022, pp. 52-53.

Ruehle et al., "Privacy Preserving Machine Learning: Maintaining Confidentiality and Preserving Trust", Microsoft Research Blog, Nov. 9, 2021, 15 pages.

Silva et al., "Privacy Risk Assessment and Privacy-Preserving Data Monitoring", Expert Systems with Applications, vol. 200, Aug. 15, 2022, 1 page.

\* cited by examiner

SYSTEMS FOR DESIGN AND IMPLEMENTATION OF PRIVACY PRESERVING AI WITH PRIVACY REGULATIONS WITHIN INTELLIGENCE PIPELINES

TECHNICAL FIELD

The present disclosure relates generally to data privacy preserving protocols and, more particularly (although not necessarily exclusively), to implementation of privacy preserving artificial intelligence.

BACKGROUND

Data platforms for clients can provide tools for identifying users or user devices, across multiple streams of user experience, that may be receptive to particular types of communication. This identification of users or user devices may include processing historical and/or current data corresponding to multiple users or user devices in view of specifics corresponding to the communication type(s). As data from multiple systems are resolved in a data platform, privacy protection can become important (e.g., due to applicable privacy regulations and/or client-identified privacy objectives).

For example, privacy regulations and/or objectives may define what constitutes personally identifiable information (PII), such that it may be obscured before the data is stored, processed, used and/or transmitted. PII data can include any information that can be used to distinguish one user from another and can be used to deanonymize previously anonymous data. Examples of PII data can include social security numbers, passport numbers, telephone numbers, credit card numbers, street addresses, patient identification numbers, email addresses, etc. However, what constitutes PII may be situation-specific. For example, assigning a given user to an income bracket may be insufficient to identify the user in most zip codes, though it may avail identifying a particular person in one or more specific zip codes. Further, regulations and/or priorities of various entities that pertain to data privacy can change over time and vary by region (e.g., as privacy regulations can change over time and by region).

If an entity collects PII, it may be important to implement protocols to ensure that storage and transmission of PII is controlled to prevent unauthorized access. However, it can also be important to control use of the PII. For example, sometimes, if a data set with PII is used to train a machine-learning (ML) model, it may be possible for the model to be interrogated (by scrutinizing outputs generated in response to particular inputs) in a manner that lets the attacker predict PII data.

SUMMARY

Techniques are provided (e.g., a method, a system, non-transitory computer-readable medium storing code or instructions executable by one or more processors) for designing and implementing privacy preserving AI with privacy regulations within intelligence pipelines. Various embodiments are described herein, including methods, systems, non-transitory computer-readable storage media storing programs, code, or instructions executable by one or more processors, and the like.

One embodiment is directed to a computer-implemented method that includes receiving, from a client system, client data that includes information corresponding to a set of users and/or set of user devices, identifying privacy protection protocols that apply to the client data, identifying a particular subset of the client data as being personally identifiable information (PII) data, wherein the particular subset includes a set of PII attributes, splitting the PII attributes into multiple predefined categories based on a format of a data field in the PII attributes, for each predefined category of the multiple predefined categories, selecting, based on the predefined category and the privacy protection protocols, a processing technique from a plurality of processing techniques, and processing PII data corresponding to the predefined category using the selected processing technique, combining the processed PII data corresponding to the multiple predefined categories with non-PII data to create processed client data, determining, based on previous input from the client system and/or based on the processed PII data, to add noise to at least part of the processed PII data, determining an amount of noise based on the privacy protection protocols, adding the amount of noise to the at least part of the processed PII data to produce protected training data, and training a machine-learning model using the protected training data.

In some embodiments, a system is provided that includes one or more data processors and a non-transitory computer readable storage medium containing instructions which, when executed on the one or more data processors, cause the one or more data processors to perform part or all of one or more methods disclosed herein.

In some embodiments, a computer-program product is provided that is tangibly embodied in a non-transitory machine-readable storage medium and that includes instructions configured to cause one or more data processors to perform part or all of one or more methods disclosed herein.

BRIEF DESCRIPTION OF THE DRAWINGS

The present disclosure is described in conjunction with the appended figures.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, specific details are set forth to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Some embodiments of the present invention relate to systems and techniques for generating and implementing privacy-protection protocols through privacy preserving Artificial Intelligence (AI). Specifically, incoming data can be parsed to differentiate data that corresponds to multiple predefined categories (e.g., categorical text data, categorical numeric, high cardinality text, high cardinality numeric, continuous numeric data, and text). In some instances, a different type of privacy-protection protocol is implemented for each category of data. For each type of data, a technique can be selected to transform the PII in the category (e.g., if a corresponding PH-transformation criterion is satisfied).

Figure 1:
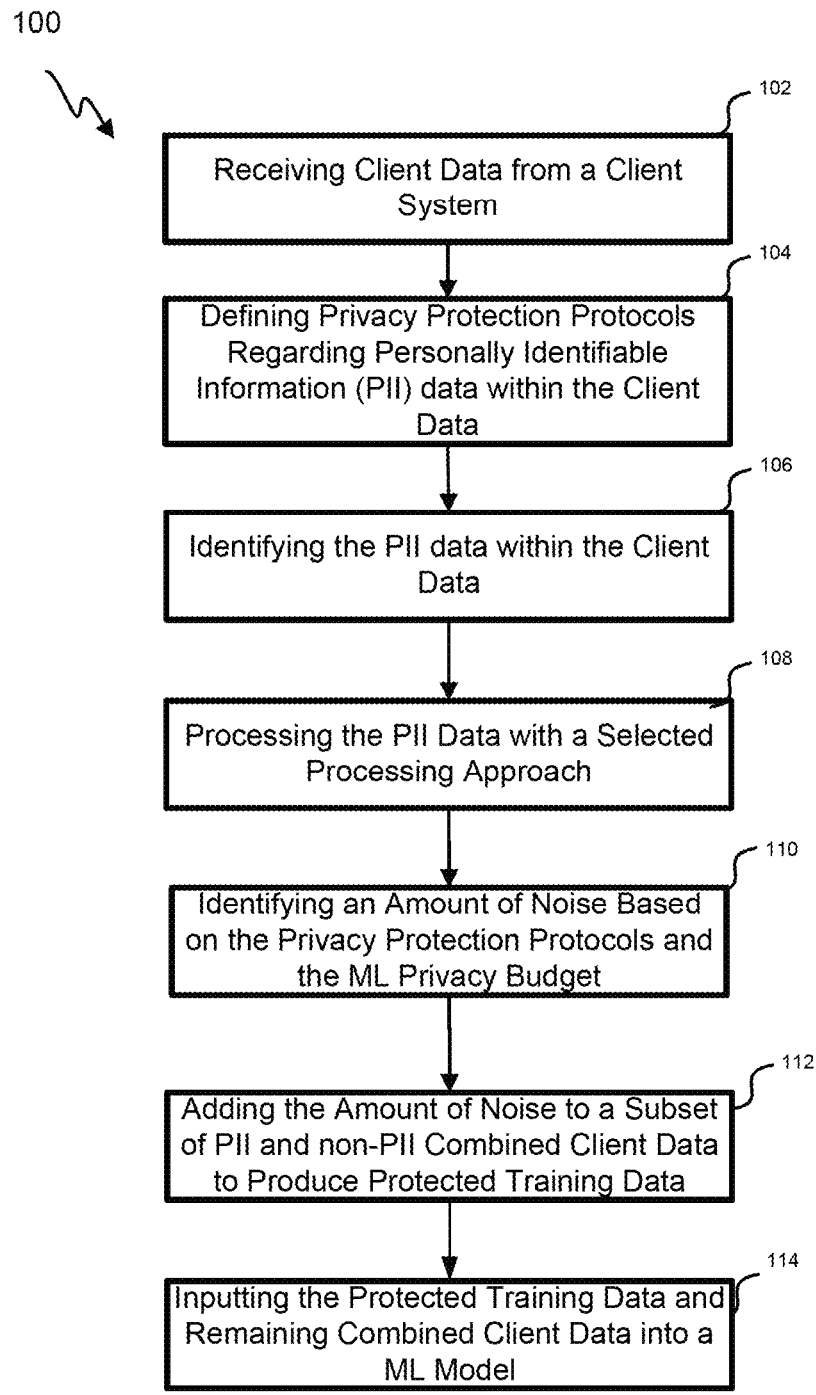
FIG. 1 depicts a flow diagram illustrating an example process for implementing the privacy preserving AI in accordance with some embodiments of the invention.

FIG. 1 depicts a flow diagram illustrating an example process 100 for implementing the privacy preserving AI in accordance with some embodiments of the invention. Block 102 includes receiving client data via a data platform from a client system. The client system can include at least one of a mobile device, cloud storage platform, personal computer, laptop, computer cluster, server, server cluster, etc. The client data may be received via an interface generated by the data platform. In some examples, the interface may identify regional and client privacy regulations for the client data.

At block 104, privacy protection protocols are defined regarding PII data within the client data. In some examples, the client can use a configuration screen to define the privacy protection protocols. Block 104 can include allowing clients to toggle to enable masking, obfuscating, or hiding PII data using a variety of privacy options. The client can choose to implement a different privacy protection protocol for different categories of PII data. In some examples, the privacy protection protocol can be determined by a server operator associated with the data platform, such as when the client chooses a default setting for the privacy protection protocol or provides limited input to the configuration screen. The privacy protection protocol can be based on regional or client privacy regulations detected by the interface when the interface receives client data. For example, the server operator can confirm that the privacy protection protocols selected by the client comply with regional privacy regulations.

Since ML model training data can include PII data, the client can choose to include privacy settings for data associated ML models as part of the privacy protection protocols. In some examples, preprocessing of ML model training data can be configured based on a ML privacy budget, which may be set by the client, a default value, etc. By adjusting the ML privacy budget, the client can define a degree to which the PII data is obscured prior to entering the ML model. For example, noise can be added to the PII data. A low amount of noise may correspond to high accuracy in the ML model but may not provide adequate privacy protection to the PII data entered in the ML model. If the amount of noise is increased, privacy protection can be enhanced but model accuracy may be reduced. In some examples, the interface can notify the client of a level of expected accuracy in the ML model based on a selected ML privacy budget. In some examples, noise can be added to algorithms or to outputs of the ML model in accordance with client selections for the privacy budget. The client can adjust the ML privacy budget in order to tune model accuracy and/or privacy. In some examples, an output of the ML model can include PII data. The client can include in the privacy protection protocol a privacy setting for the output.

At block 106, the process includes identifying the PII data within the client data. In some examples, the client data is transferred to a PII identifier module. The PII identifier module can identify which attributes contain PII and which are non-PII attributes. For example, the module may recognize that sets of nine-digit numbers indicate social security numbers or sets of seven or sets of ten-digit numbers indicate U.S. telephone numbers including area codes. The PII identifier module can identify PII attributes using PII identifier programs as well as imported PII infotype recognition libraries. A data type splitter module can split the PII attributes into several categories. The categories include categorical text, categorical numeric, high cardinality text, high cardinality numeric, continuous, text, etc.

At block 108, the process includes processing the PII data with a selected processing approach. In some examples, the data type splitter module can process the PII attributes based on category and based on privacy rules and heuristics associated with the privacy protection protocols supplied by the client. There can be several processing techniques for processing the PII attributes including for example adding noise to the PII data in ML model training data. In some examples, block 110 can include inbuilt masking, hashing, pseudonymization, or anonymization of identified PII data based on PII Infotype.

At block 110, the process includes identifying an amount of noise based on the privacy protection protocols and the ML privacy budget. Though adding noise to ML training data may provide a degree of protection for the ML model, it can also reduce the accuracy of the ML model. Therefore, an amount of noise may be determined based on the ML privacy budget identified by the client, such that the client can control this balance.

At block 112, the process includes adding the amount of noise to a subset of PII and non-PII combined client data to produce protected training data. If data privacy is chosen fora category of PII data by the client, Random, Gaussian, or Laplace noise can be added to the category of data for PII attributes. Noise may not be added to the non-PII client data included in the protected training data.

Block 114 of the process includes inputting the protected training data into the ML model. Once trained, the ML model can produce an output. In some examples, output is returned to the client device.

Figure 2:
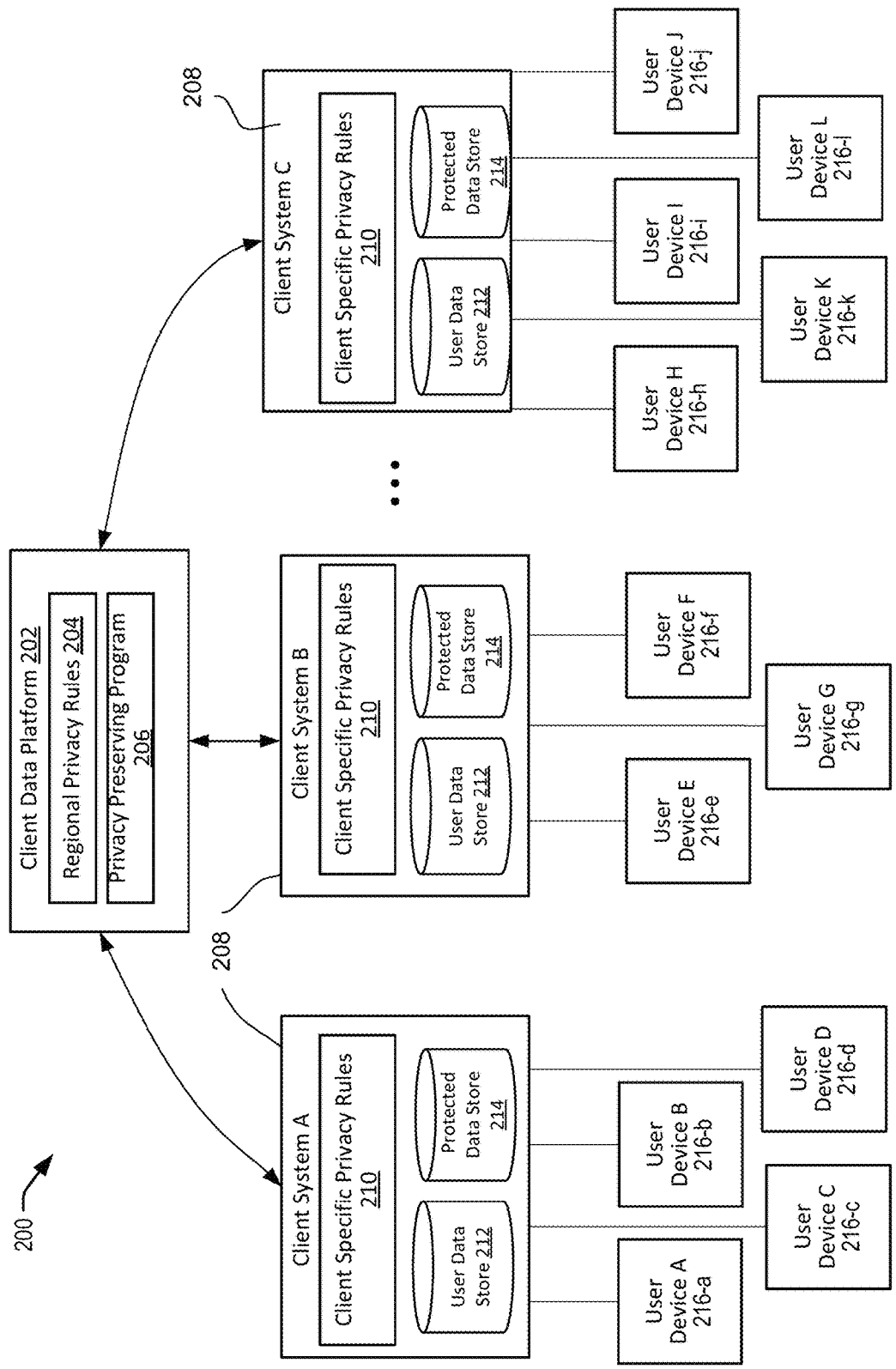
FIG. 2 depicts a database environment for implementing privacy preserving AI in accordance with at least some embodiments of the present invention.

FIG. 2 depicts a database environment 200 for implementing privacy preserving AI in accordance with at least some embodiments of the present invention. The database environment 200 includes a client data platform 202 and a plurality of client systems 208. Although three client systems are illustrated in FIG. 2, more or less client systems may be present in the database environment 200. Each client system of the plurality of client systems 208 can receive client data from user devices 216. For example, Client System A can receive data from User Device A 216-*a*, User Device B 216-*b*, User Device C 216-*c*, and User Device D 216-*d*. Client System B can receive data from User Device E 216-*e*, User Device F 216-*f*, and User Device G 216-*g*. Client System C can receive data from User Device H 216-*a*, User Device I 216-*i*, User Device J 216-*j*, User Device K 216-*k*, and User Device L 216-*l*. Although twelve user devices 216 are depicted in FIG. 2, more or less user devices 216 may be present in the database environment 200. The client data received from user devices 216 can include PII data.

Each client system of the plurality of client systems 208 can store client data in a user data store 212. Each client system of the plurality of client systems 208 can communicate with the client data platform 202. Each client system can transmit client specific privacy rules 210 to the client data platform 202. In some examples, for each client system, the client data platform 202 can determine applicable regional privacy rules 204 for the client system by detecting locations of users associated with the client. Detecting locations of users can involve extracting fields of information from data involved in communication with the user devices 216. In some examples, locations of users can be extracted from home address data included in the client data. In some examples, the client data platform can receive information regarding regional privacy rules 204 from the client.

The client data platform 202 can communicate with each client system within the plurality of client systems 208 to define privacy protection protocols regarding PII data within each client system. In some examples, a client can use a configuration screen to define the privacy protection protocols. The client can choose to implement a different privacy protection protocol for different categories of PII data. In some examples, the client can define a privacy budget to provide privacy settings for client data associated with ML models of the client.

In some examples, the client data platform 202 can receive user data from the client and a client specific privacy preserving program can be implemented by the client data platform 202. The client data platform 202 can modify a privacy preserving program 206 to create a client specific privacy preserving program that includes the privacy protection protocols and is based on the client specific privacy rules, the applicable regional privacy rules, and the privacy budget. In some examples, a client system can receive the privacy preserving program 206 from the client data platform 202 and the privacy preserving program can be implemented by the client system. Each client system can use the client specific preserving program to implement privacy-protection protocols and maintain data security measures that comply with regional and client specific privacy rules.

Figure 3:
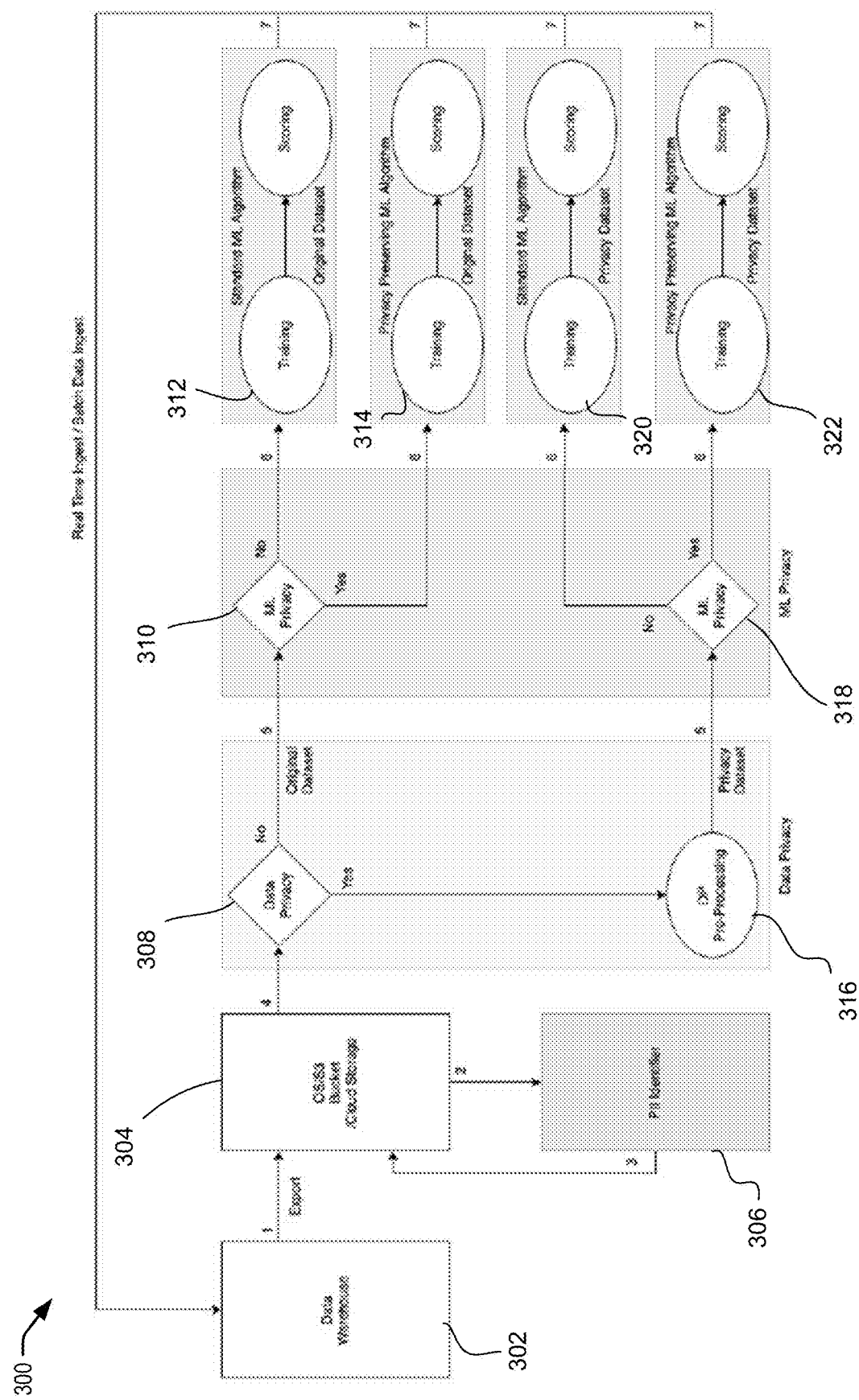
FIG. 3 is a diagram depicting flow of client data through privacy protection protocols in accordance with at least some embodiments.

FIG. 3 is a diagram depicting flow of client data through privacy protection protocols in accordance with at least some embodiments. The client data includes data collected from users associated with a client. The data collected from the users can include PII data. The users associated with the client can reside in various regions. Regions can include various collections of countries, individual countries, states, provinces, etc. Privacy-protection policies for PII data of users can vary by region and by sector. For example, a country can require clients to implement and maintain specific data security measures to protect financial information of users that are citizens of the country. Client data can originate from user devices, which can include mobile devices, personal computers, laptops, smart watches, etc. The client data can be consolidated into a data repository associated with a client system called a data warehouse 302. The client data can include both PII and non-PII attributes.

In some examples, client data from the data warehouse 302 can be exported into a client data platform 202. In the example illustrated in FIG. 3, the client data platform 202 is shown to include cloud storage 304 or an object storage (OS) or simple storage service (S3) bucket. A PII identifier module 306 associated with the client data platform 202 can analyze client data in the cloud storage 304. The PII identifier module 306 can identify which attributes contain PII attributes and which contain non-PII attributes using techniques such as PII identifier programs, PII infotype recognition libraries, or client-identified PII definitions. Identification of PII attributes can differ by organization, domain, country, and region, and such specificity may be reflected by (for example) program functions, libraries, or client-specified definitions. The PII identifier module 306 can be configured to incorporate various public or private PII Infotype libraries. The PII infotype libraries can be stored within the client data platform 202 or the PII infotype libraries can be received from and associated with the client. Examples of PII Infotype libraries include Presidio (Microsoft SDK), AWS Detect PII, and Open Source libraries.

A data type splitter module can split the PII attributes into several categories. The categories include categorical text, categorical numeric, high cardinality text, high cardinality numeric, continuous, text, etc. For example, the data type splitter module can separate the PII data with numeric attributes (numeric data) from PII data with categorical attributes (categorical data). Examples of numeric data can include zip codes, salaries, ages, social security numbers, birthdate, etc. Examples of categorical data can include name, gender, city of residence, race, birthplace, etc. Categorical data can be identified using rules-based algorithms, such as Entity recognition algorithms, such as a Named Entity Recognition (NER) algorithm. Pattern recognition techniques can be used to identify certain kinds of numeric (such as bank account data) or certain kinds of categorical data (such as national identity).

A privacy-protection protocol 308 can be implemented to attributes within the client data. Since privacy-protection policies can vary by region, the privacy-protection protocol 308 can depend on the citizenship of the users associated with the client data. In some examples, identifying the privacy-protection protocol 308 can include determining one or more geographical regions that correspond to the client system and retrieving one or more data-protection restrictions that correspond to the one or more geographical regions. The privacy-protection protocol 308 may also depend on client-specified privacy-protection policies. A decision to implement the privacy-protection protocol 308 can depend on whether attributes of client data are PII attributes or non-PII attributes. The privacy-protection protocol 308 implemented on PII attributes can depend on the category of the PII attributes. For example, noise (e.g., Gaussian noise) may be added to numeric data as data privacy (DP) pre-processing 316 when the numeric data is subject to a regional privacy-protection policy. In other examples, the numeric data is not subject to a privacy-protection policy and the privacy protection protocol is not implemented for the numeric data. In other words, noise is not added to numeric data when the numeric data is not subject to a privacy-protection policy. If the privacy-protection protocol 308 is not to be implemented for a first set of data, (e.g. the first set of data only contains non-PII attributes), then the first set of data can be used to train a ML model without being subjected to (DP) pre-processing 316.

If a data set with PII is used to train a machine-learning (ML) model, it may be possible for the model to be interrogated (by scrutinizing outputs generated in response to particular inputs) in a manner that lets the attacker predict PII data. The preprocessing of ML model training data can be configured based on a ML privacy budget, which may be set by the client, a default value, etc. By adjusting the ML privacy budget, the client can define a degree to which the PII data (or non-PII data) is obscured prior to entering the ML model. For example, noise can be added to the PII data. A low amount of noise may correspond to high accuracy in the ML model but may not provide adequate privacy protection to the PII data entered in the ML model. If the amount of noise is increased, privacy protection can be enhanced but model accuracy may be reduced.

A ML privacy protocol 310 can be implemented to process the first set of data even if the privacy-protection protocol 308 was not implemented for the first set of data. If the ML privacy protocol 310 is not selected for the first set of data, training data for a ML model using a standard ML algorithm can include the first set of data at block 312. Once trained, ML scoring can occur, and the outcome of the standard ML model can be returned to the client via the data warehouse 302. If the ML privacy protocol 310 is selected for the first set of data, training data for a ML model using a privacy protected ML algorithm can include the first set of data at block 314. Once trained, ML scoring can occur and the outcome of the privacy protected ML model can be returned to the client via the data warehouse 302.

If the privacy-protection protocol 308 is to be implemented for a second set of data (e.g., the second set of data includes at least one category of PII attributes subject to a privacy-protection policy), then the second set of data can be subjected to DP pre-processing 316. DP pre-processing 316 can include inbuilt masking, hashing, pseudonymization, or anonymization of the second set of data based on PII Infotype. The type of pre-processing can depend on the categories of PII attributes included in the second set of data. For example, random, Gaussian, or Laplacian noise can be added to numerical attributes and categorical attributes can be encrypted.

A ML privacy protocol 318 can be implemented to the second set of data. If the ML privacy protocol 318 is not selected for the second set of data, training data for a ML model using a standard ML algorithm can include the second set of data at block 320. Once trained, ML scoring can occur and the outcome of the standard ML model can be returned to the client via the data warehouse 302. If the ML privacy protocol 318 is selected for the second set of data, training data for a ML model using a privacy protected ML algorithm can include the first set of data at block 322. Once trained, ML scoring can occur and the outcome of the privacy protected ML model can be returned to the client via the data warehouse 302.

Figure 4:
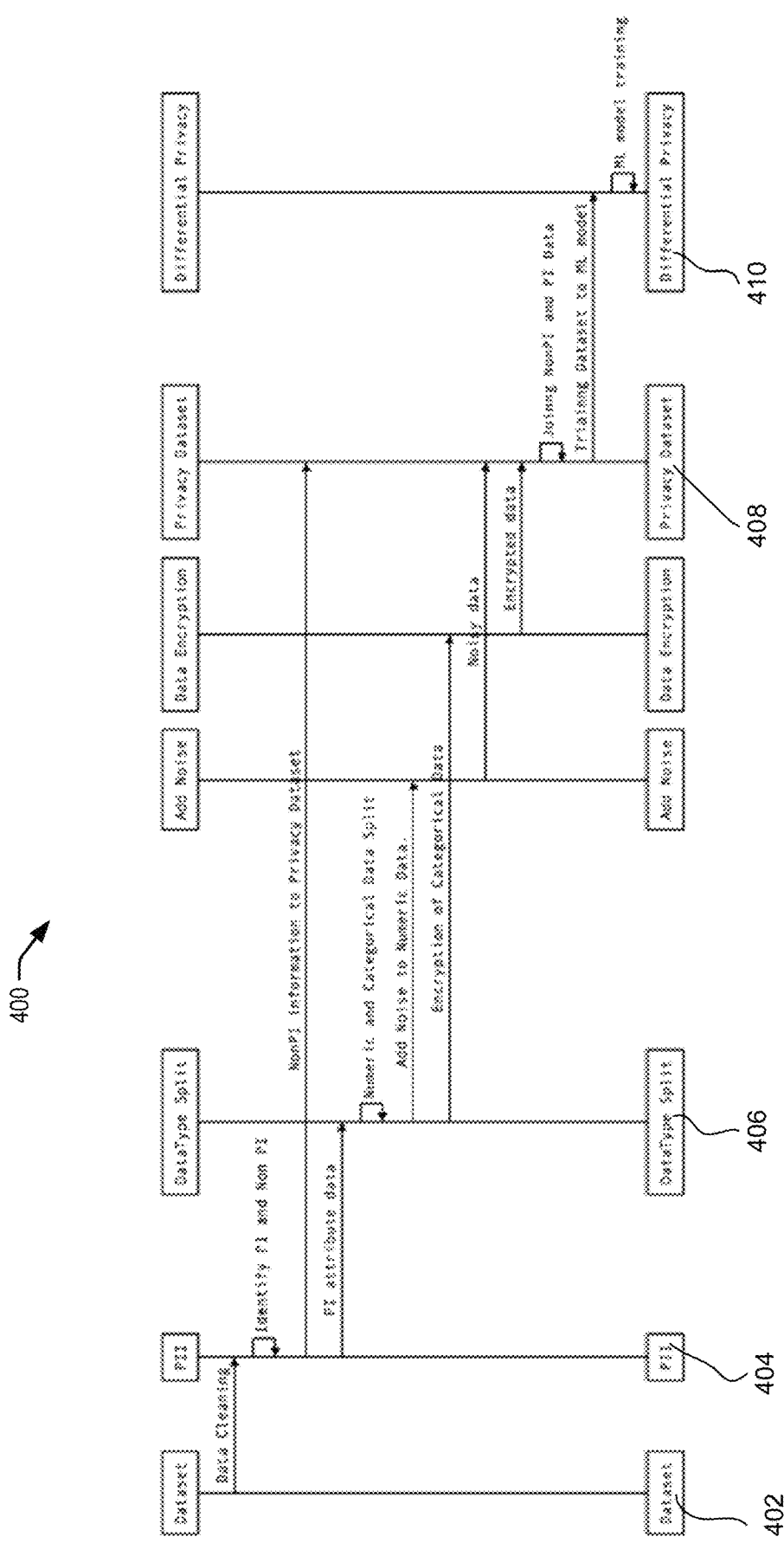
FIG. 4 is a flow diagram illustrating an example process for privacy preservation of client data by implementing privacy rules in accordance with some embodiments of the invention.

FIG. 4 is a flow diagram illustrating an example process 400 for privacy preservation of client data by implementing privacy rules in accordance with some embodiments of the invention. Block 402 includes data cleaning of client data. Data cleaning can involve fixing incorrect, incomplete, duplicate, or otherwise erroneous data from data sets in the client data. For example, data cleaning can involve correcting syntax errors or errors involving format. As an example, a recorded birthdate of 13.03.92 can be changed to 03/13/92 to conform with or match other data in a dataset.

Block 404 includes transferring the client data to a PII identifier module 306 to identify PII attribute data and non-PII attribute data within the client data. The PII identifier module 306 can identify PII attributes within the client data using PII identifier programs as well as imported PII infotype recognition libraries. Infotype recognition libraries can determine patterns in sets of data that can be used to identify PII attributes. For example, in the United States, sets of data with 5 digits can refer to zip codes or data in a format with (XXX)-XXX-XXXX where X is any numeric digit can be recognized as telephone numbers. The PII identifier module 306 can be configured to support various public or private PII Infotype libraries. The PII Infotype libraries supported by the PII identifier module 306 can be updated periodically.

Block 406 involves transferring the PII attribute data to a data type splitter module. A data type splitter module can split the PII attributes into several categories. The categories can include categorical text, categorical numeric, high cardinality text, high cardinality numeric, continuous, text, etc. For example, the data type splitter module can separate the PII data with numeric attributes (numeric data) from PII data with categorical attributes (categorical data). Examples of numeric data can include zip codes, salaries, ages, social security numbers, birthdate, etc. In some examples, numeric data in a region can be identified by comparing population distributions in the region. For example, if a set of PII data displays a significant amount of overlap (e.g., more than 50% overlap) with a population distribution, then the PII data can be identified as numeric data. Examples of categorical data can include name, gender, city of residence, race, birthplace, etc. Categorical data can be identified using Entity recognition algorithms, such as a NER Algorithm. Pattern-recognition techniques can be used to identify certain kinds of numeric (such as bank account data) or certain kinds of categorical data (such as national identity).

Block 408 involves applying privacy rules to the numeric data and to the categorical data. Origins of client data can affect the privacy rules since privacy regulation can vary by country and region. In some examples, applying privacy rules to the numeric data involves transforming the numeric data into noisy data by adding noise to the numeric data. The noise can include Random, Gaussian, or Laplace noise. The privacy rules applied to PII data can depend on the type, For example, categorical numeric data that includes a limited number of values to denote gender may require less rigorous privacy steps than the privacy protocol requirements for PII data that includes bank account numbers or social security numbers for users. In some examples, applying privacy rules to the categorical data involves transforming the categorical data into encrypted data by adding an encryption to the categorical data. The noisy data and the encrypted data can be combined to form a privacy dataset.

Block 410 involves training a machine model with protected training data. For example, the noisy data, the encrypted data, and the non-PII attribute data can be joined to form the protected training data. Once trained, the ML model can produce an output. In some examples, the output can correspond to a client-defined prediction and the determined prediction can be returned to a client device. If there is PII attribute data within the output, privacy rules can be applied to the PII attribute output data.

Figure 5:
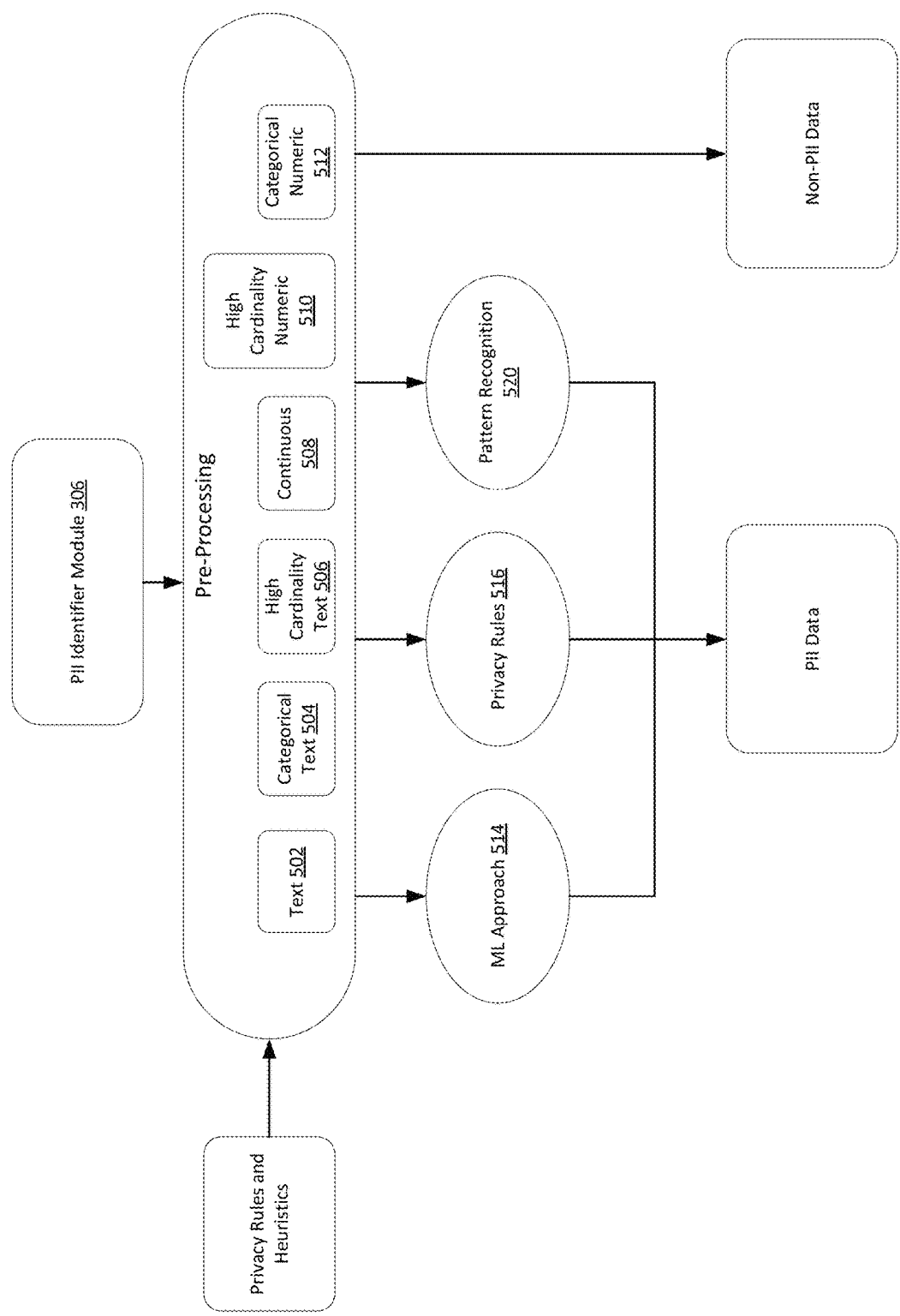
FIG. 5 is a block diagram depicting a separation of PII data and non-PII data by a PII identifier module in accordance with embodiments.

FIG. 5 is a block diagram depicting a separation of PII data and non-PII data by a PII identifier module 306 in accordance with embodiments. A pre-processing module of the PII identifier module 306 can separate client data into categories based on attribute types. The attribute types can be PII attributes and non-PII attributes. The categories based on attribute types can include text 502, categorical text 504, high cardinality text 506, continuous text 508, high cardinality numeric 510, and categorical numeric 512.

Categorical text 504 can include text associated with a fixed or limited number of possible values. An example of categorical text 504 can include a name of a make of a vehicle driven by a user. Another example of categorical text is a state of residence for the user. High cardinality data can include data that is very unique or uncommon that may be used to identify a user. Examples of high cardinality text 506 include email addresses, user names, and the like. Examples of high cardinality numeric 510 include bank account numbers, social security numbers, phone numbers, etc. Categorical numeric 512 can include numeric values assigned to a limited number of possible values. Examples of categorical numeric can be limited numeric values assigned to each possible gender or to each possible blood type. Continuous text 508 data can include text assembled into sentences which are compiled into paragraphs which are organized into sections and chapters, etc.

Various techniques can be used to identify PII data within the categories based on attribute types. PII data can be identified within the text 502 category using a ML model approach 514. For example, the ML model approach 514 can be applied to a column of text to search for PII attributes such as personal names, organization names, and locations. If the ML model approach finds PII attributes within at least a threshold percentage (e.g., at least 80%) of rows in the column, the column is identified as PII data. Additionally, privacy rule-based techniques 516 can be applied to identify PII data. For example, the high cardinality numeric 520 categories can be compared to distributions of PII attributes such as age, location population, or salary. If a distribution set of high cardinality numeric 520 data displays statistically significant overlap with the distributions, the set can be identified as PII data. Pattern recognition 518 is another technique that identifies PII data, such as passport numbers, tax identification numbers, national identification numbers, bank account numbers, etc.

Figure 6:
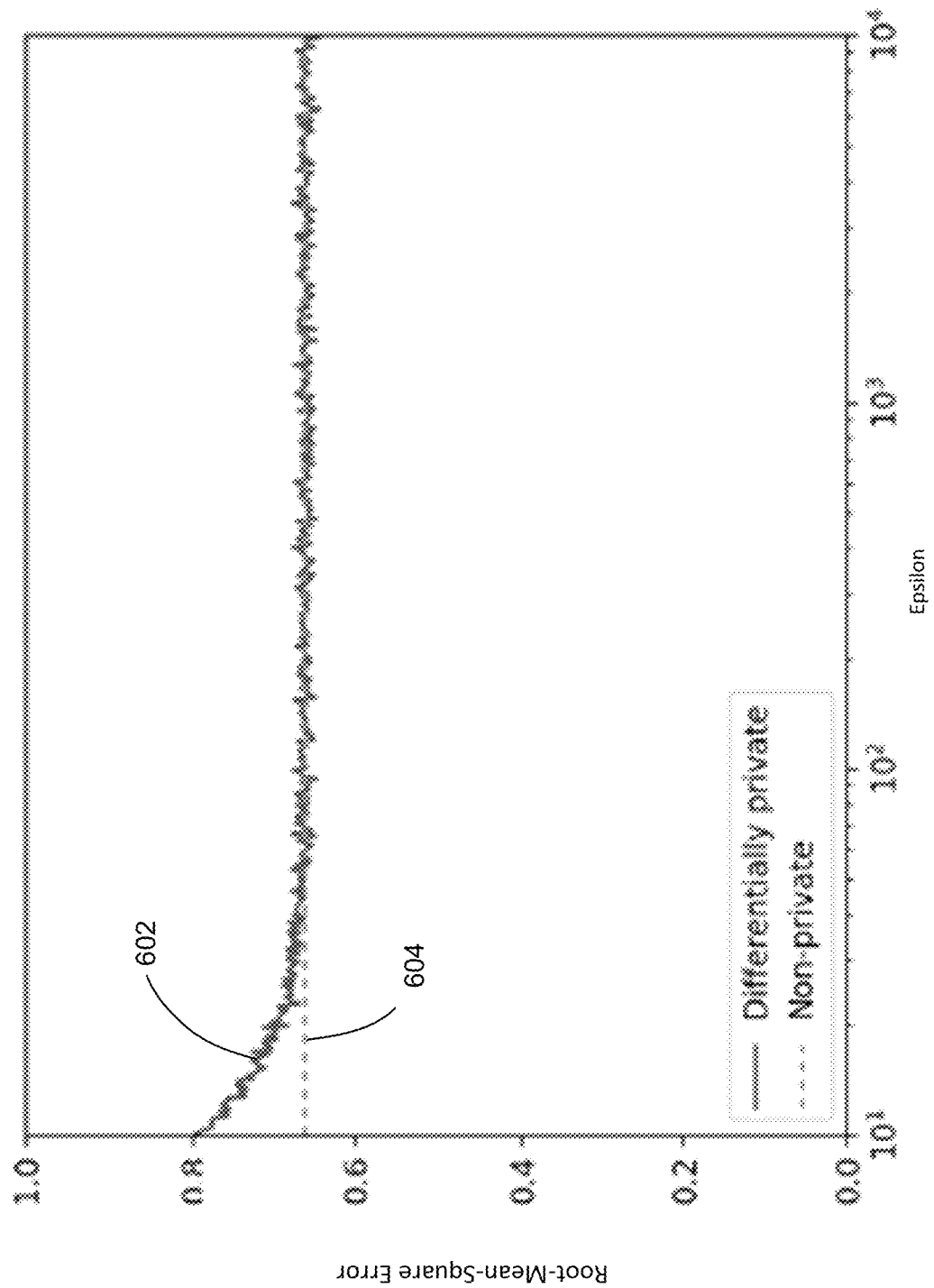
FIG. 6 is a graph that illustrates a dependence of a root-mean-square error of a recommender algorithm when noise is added to ML model training data in accordance with embodiments.

FIG. 6 is a graph that illustrates a dependence of a root-mean-square error of a recommender algorithm when noise is added to ML model training data in accordance with embodiments. Rigorous privacy techniques for ML model algorithms may be necessary to protect PII data used to train ML models. A list of potential threats to ML systems can include de-anonymization (re-identification) attacks, reconstruction attacks, parameter interference attacks, model inversion attacks, membership inference attacks, etc. Even when a dataset is anonymized, attackers can utilize background knowledge to infer data with the de-anonymization or re-identification attacks. Attackers can gain external knowledge of feature vectors of ML model training data in reconstruction attacks. In model inversion attacks, attackers can discover new testing sample submissions to the ML model by a user and responses generated by the ML model regarding the new testing sample. In a membership inference attack, an attacker gains access to ML model outputs and may identify whether a particular set of PII data was used to train the ML model based on the identified outputs.

Table 1 includes various methods that can protect PII data involved in ML models. Protection of data incorporated in the ML model can be configured based on a ML privacy budget, which may be set by the client, a default value, etc. By adjusting the ML privacy budget, the client can define a degree to which PII data involved in the ML model. Noise can be added at various stages associated with the ML model. To protect PII data used to train ML models, in some examples, a differential privacy approach can be taken. Differential privacy refers to techniques that are implemented to ensure bounds on how much information may be revealed due to participation in a database. Basically, differential privacy provides a limit to an amount of information that an attacker can access.

TABLE 1

Description of techniques used to protect PII attributes in ML models.

| Technique | Use Case | Algorithms |
|---|---|---|
| Adding noise to input | Adding noise to data used to train the ML model | Recommender algorithms and linear regression |
| Algorithmic noise addition | Adding noise to the ML model parameters, adding noise to loss during each iteration of ML model | Classification models and deep learning algorithms |
| Adding noise to output | Adding noise to the output of the ML model | Principal component analysis, statistical models |

The bounds provided by differential privacy can be determined by a variable denoted by the Greek letter epsilon (E). A value for epsilon is roughly a number of bits of information that an analyst might determine about an individual from the database. Epsilon is a parameter that can be linked to the ML privacy budget. A value for epsilon can be selected based on the ML privacy budget. A smaller value of epsilon results in a larger amount of added noise (i.e., greater privacy budget). Therefore, smaller values of epsilon are associated with stronger privacy protection but reduced accuracy.

The graph in FIG. 6 shows the relationship between the RMSE of a recommender algorithm and the value of epsilon when a privacy budget is applied to training data for the ML model. For comparison, a non-privacy value 604 for RMSE when noise is not added is also shown. In this example, the non-privacy value 604 is 0.6854. As epsilon increases, a difference between RMSE for privacy data 602 and the non-privacy value 604 is reduced. When the value of epsilon is decreased the difference between the privacy data 602 and the non-privacy value 604 increases.

Figure 7:
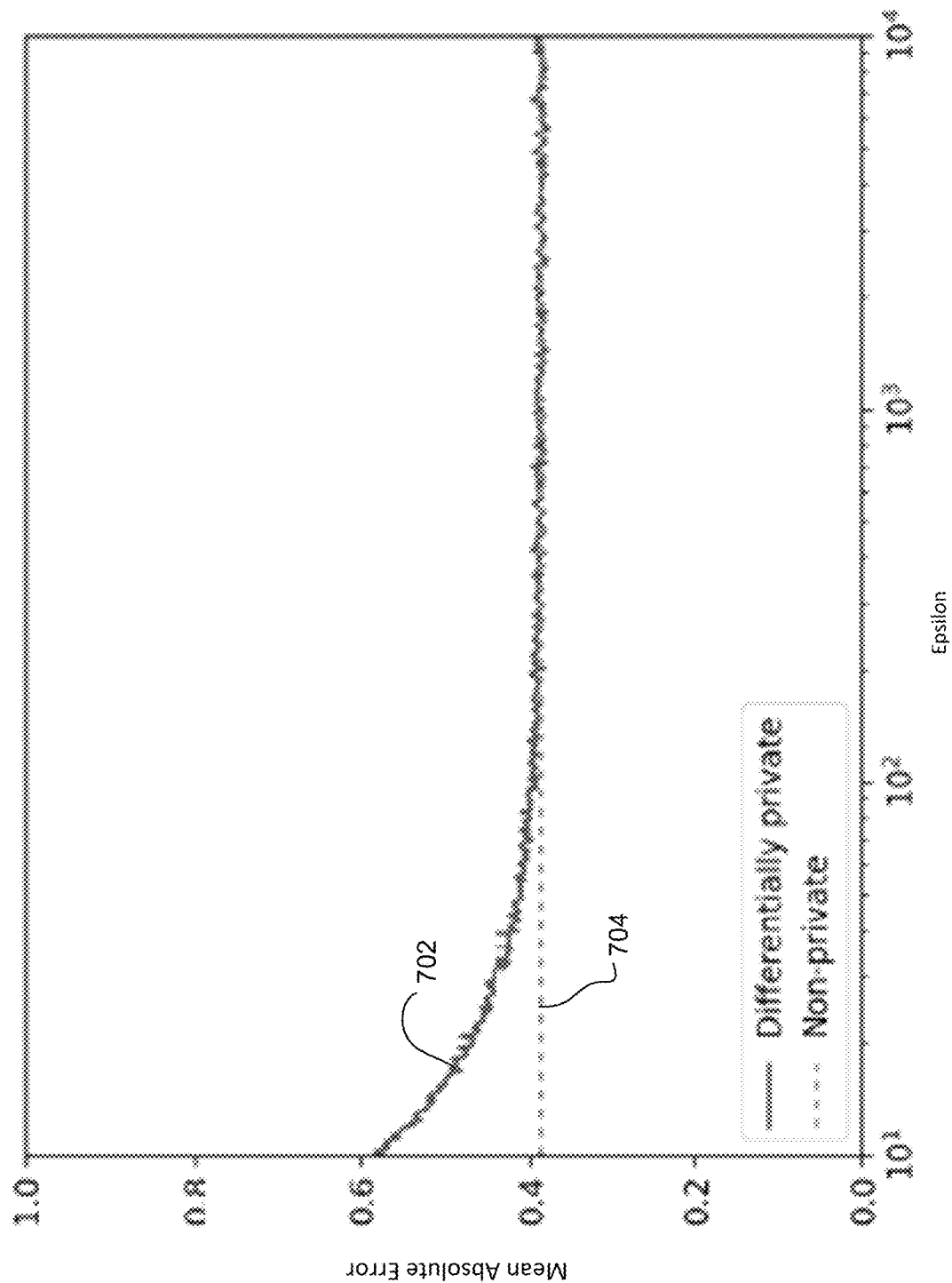
FIG. 7 is a graph that shows the relationship between the Mean Absolute Error of a recommender algorithm and the value of epsilon when a privacy budget is applied to training data for the ML model.

FIG. 7 is a graph that shows the relationship between the Mean Absolute Error of a recommender algorithm and the value of epsilon when a privacy budget is applied to training data for the ML model. For comparison, a non-privacy value 704 for Mean Absolute Error when noise is not added is also shown. In this example, the non-privacy value 704 of the Mean Absolute Error is 0.398. As epsilon increases, a difference between Mean Absolute Error for privacy data 702 and the non-privacy value 704 of the Mean Absolute Error is reduced. When epsilon is decreased the difference between the privacy data 702 and the non-privacy value 704 for Mean Absolute Error increases.

Figure 8:
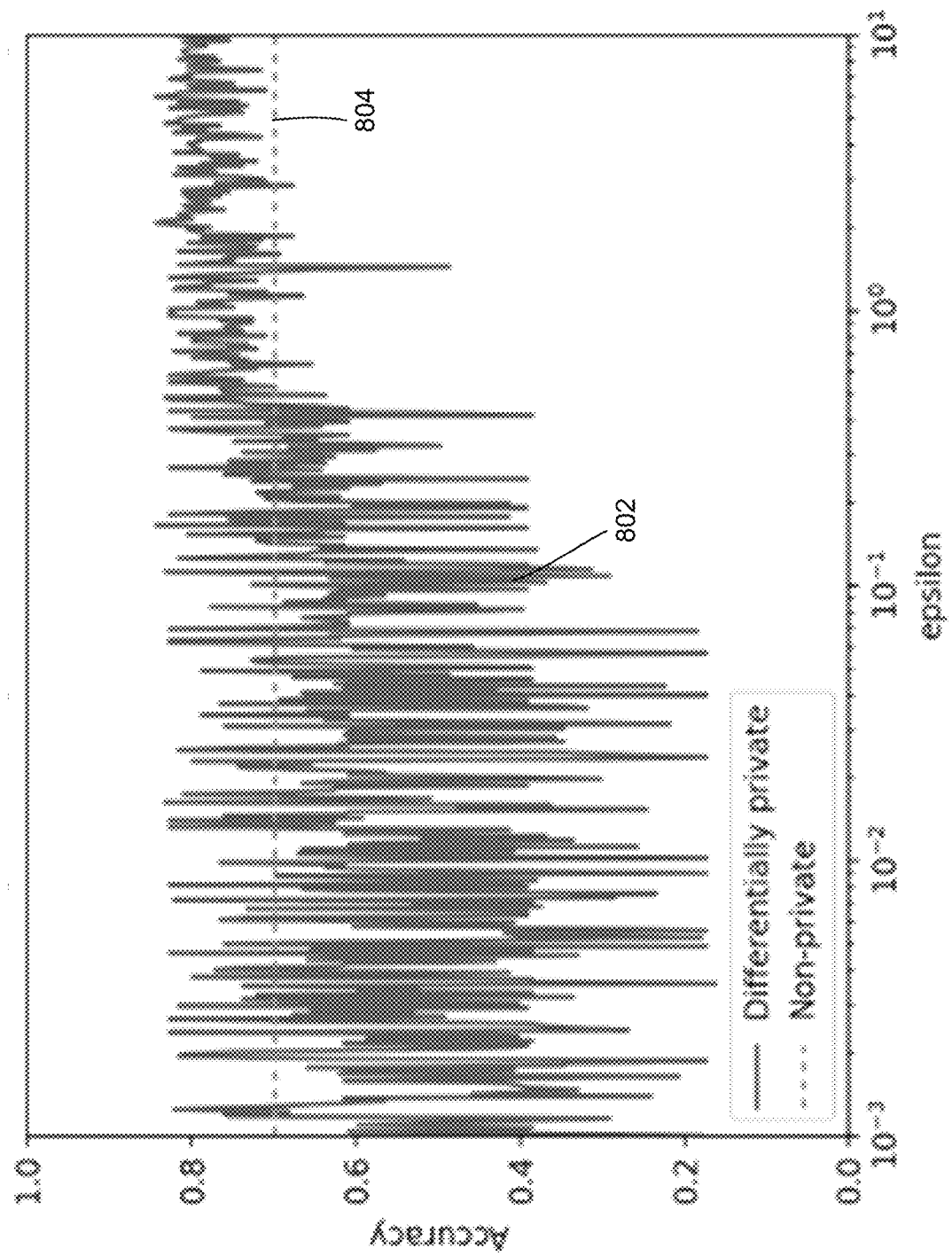
FIG. 8 is a graph that depicts the accuracy of a ML model as a function 802 of epsilon using an algorithmic noise addition approach in ML model privacy protocols in accordance with embodiments

FIG. 8 is a graph that depicts the accuracy of a ML model as a function 802 of epsilon using an algorithmic noise addition approach in ML model privacy protocols in accordance with embodiments. In the algorithmic noise addition approach, the ML model can take several iterations to complete a ML model training stage. During the ML model training stage, model parameters may be optimized through attempts to reduce noise with each iteration. Various ML algorithms used can include logistic regression, naive Bayes, stochastic gradient descent, or deep neural networks. The graph in FIG. 8 depicts the accuracy of a Naive Bayes algorithm as epsilon is varied. As noted above, a selected value for epsilon can affect an amount of noise added to the Naive Bayes algorithm. For comparison, a value 804 for the accuracy when noise is not added to the algorithm is also shown. The graph shows that lower epsilon values can provide more privacy protection but reduced accuracy.

Figure 9:
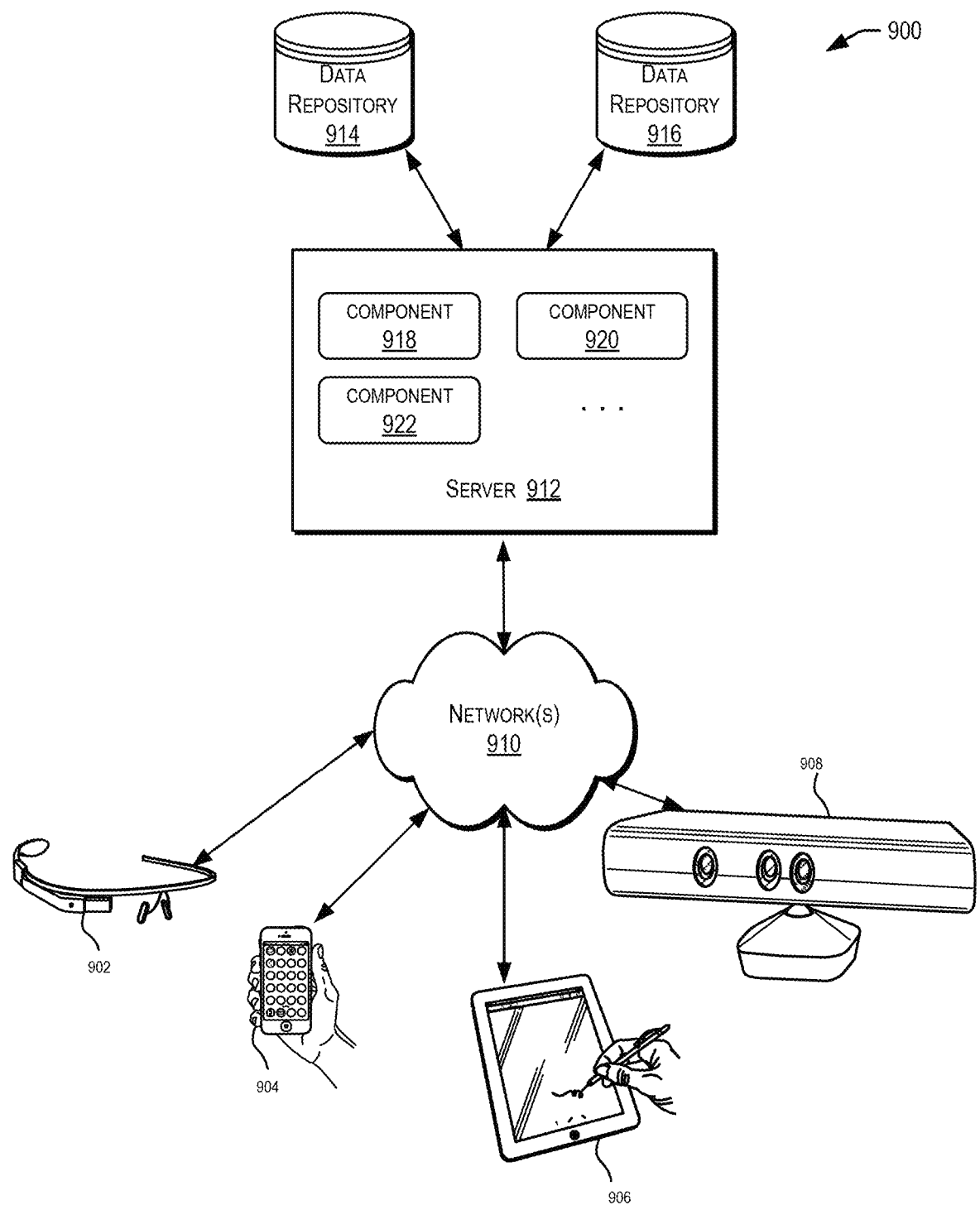
FIG. 9 depicts a simplified diagram of a distributed system 900 for implementing an embodiment.

FIG. 9 depicts a simplified diagram of a distributed system 900 for implementing an embodiment. In the illustrated embodiment, distributed system 900 includes one or more client computing devices 902, 904, 906, and 908, coupled to a server 912 via one or more communication networks 910. Client computing devices 902, 904, 906, and 908 may be configured to execute one or more applications.

In various embodiments, server 912 may be adapted to run one or more services or software applications that enable the processing described in this disclosure.

In certain embodiments, server 912 may also provide other services or software applications that can include non-virtual and virtual environments. In some embodiments, these services may be offered as web-based or cloud services, such as under a Software as a Service (SaaS) model to the users of client computing devices 902, 904, 906, and/or 908. Users operating client computing devices 902, 904, 906, and/or 908 may in turn utilize one or more client applications to interact with server 912 to utilize the services provided by these components.

In the configuration depicted in FIG. 9, server 912 may include one or more components 918, 920, and 922 that implement the functions performed by server 912. These components may include software components that may be executed by one or more processors, hardware components, or combinations thereof. It should be appreciated that various different system configurations are possible, which may be different than the distributed system 900. The embodiment shown in FIG. 9 is thus one example of a distributed system for implementing an embodiment system and is not intended to be limiting.

Users may use client computing devices 902, 904, 906, and/or 908 to interact with server 912 in accordance with the teachings of this disclosure. A client device may provide an interface that enables the user of the client device to interact with the client device. The client device may also output information to the user via the interface. Although FIG. 9 depicts only four client computing devices, any number of client computing devices may be supported.

The computing devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony Playstation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 910 may be any type of network familiar to those skilled in the art that can support data communications using any of a variety of available protocols, including without limitation TCP/IP (transmission control protocol/Internet protocol), SNA (systems network architecture), IPX (Internet package exchange). AppleTalk®, and the like. Merely by way of example, network(s) 910 can be a local area network (LAN), networks based on Ethernet, Token-Ring, a wide area network (Wan), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 912 may be composed of one or more general purpose computers, specialized server computers (including, by way of example, PC (personal computer) servers, UNIX® servers, mid-range servers, mainframe computers, rack-mounter servers, etc.), server farms, server clusters, or any other appropriate arrangement and/or combination. Server 912 can include one or more virtual machines running virtual operating systems, or other computing architectures involving virtualization such as one or more flexible pools of logical storage devices that can be virtualized to maintain virtual storage devices for the server. In various embodiments, server 912 may be adapted to run one or more services or software applications that provide the functionality described in the foregoing disclosure.

The computing systems in server 912 may run one or more operating systems including any of those discussed above, as well as any commercially available server operating system. Server 912 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 912 may include one or more applications to analyze and consolidate data feeds and/or event updates received from the users of client computing devices 902, 904, 906, and 908. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 912 may also include one or more applications to display the data feeds and/or real-time events via one or more display devices of client computing devices 902, 904, 906, and 908.

Distributed system 900 may also include one or more data repositories 914, 916. These data repositories may be used to store data and other information in certain embodiments. For example, one or more of the data repositories 914, 916 may be used to store data or information generated by the processing described herein and/or data or information used for the processing described herein. Data repositories 914, 916 may reside in a variety of locations. For example, a data repository used by server 912 may be local to server 912 or may be remote from server 912 and in communication with server 912 via a network-based or dedicated connection. Data repositories 914, 916 may be of different types. In certain embodiments, a data repository used by server 912 may be a database, for example, a relational database, such as databases provided by Oracle Corporation® and other vendors. One or more of these databases may be adapted to enable storage, update, and retrieval of data to and from the database in response to SQL-formatted commands.

In certain embodiments, one or more of the data repositories 914, 916 may also be used by applications to store application data. The data repositories used by applications may be of different types.

Figure 10:
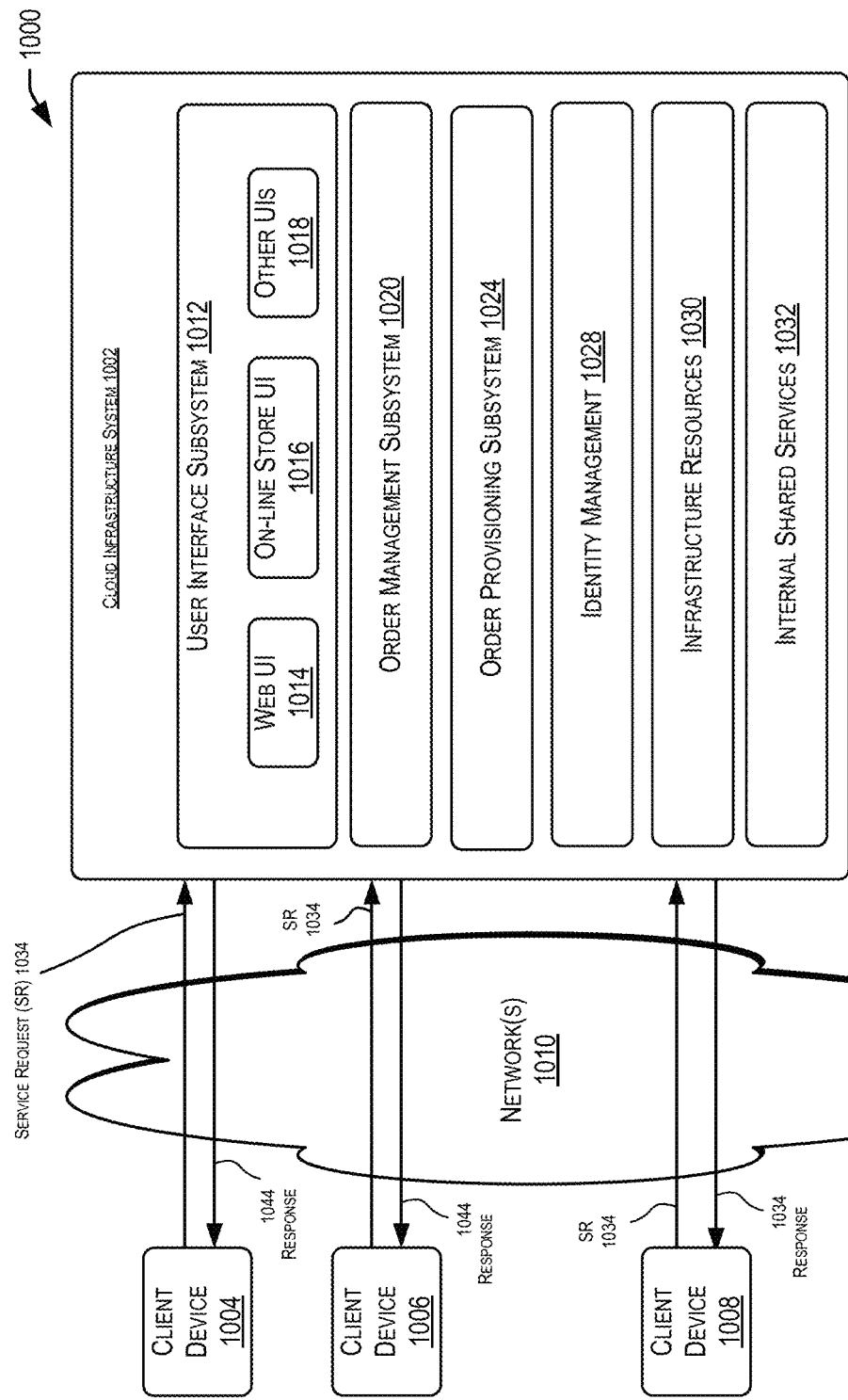
FIG. 10 is a simplified block diagram of a cloud-based system environment in which functionalities described herein may be offered as cloud services, in accordance with certain embodiments.

In certain embodiments, the functionalities described in this disclosure may be offered as services via a cloud environment. FIG. 10 is a simplified block diagram of a cloud-based system environment in which functionalities described herein may be offered as cloud services, in accordance with certain embodiments. In the embodiment depicted in FIG. 10, cloud infrastructure system 1002 may provide one or more cloud services that may be requested by users using one or more client computing devices 1004, 1006, and 1008. Cloud infrastructure system 1002 may comprise one or more computers and/or servers that may include those described above for server 912. The computers in cloud infrastructure system 1002 may be organized as general purpose computers, specialized server computers, server farms, server clusters, or any other appropriate arrangement and/or combination.

Network(s) 1010 may facilitate communication and exchange of data between clients 1004, 1006, and 1008 and a cloud infrastructure system. Network(s) 1010 may include one or more networks. The networks may be of the same or different types. Network(s) 1010 may support one or more communication protocols, including wired and/or wireless protocols, for facilitating the communications.

The embodiment depicted in FIG. 10 is only one example of a cloud infrastructure system and is not intended to be limiting. It should be appreciated that, in some embodiments, cloud infrastructure system 1002 may have more or fewer components than those depicted in FIG. 10, may combine two or more components, or may have a different configuration or arrangement of components. For example, although FIG. 10 depicts three client computing devices, any number of client computing devices may be supported in alternative embodiments.

The term cloud service is generally used to refer to a service that is made available to users on demand and via a communication network such as the Internet by systems (e.g., cloud infrastructure system 1002) of a service provider. Typically, in a public cloud environment, servers and systems that make up the cloud service provider's system are different from the customer's own on-premise servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources, and services. Several providers offer cloud services. For example, several cloud services are offered by Oracle Corporation® of Redwood Shores, California, such as middleware services, database services, Java cloud services, and others.

In certain embodiments, cloud infrastructure system 1002 may provide one or more cloud services using different models such as under a Software as a Service (SaaS) model, a Platform as a Service (PaaS) model, an Infrastructure as a Service (IaaS) model, and others, including hybrid service models. Cloud infrastructure system 1002 may include a suite of applications, middleware, databases and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 1002. Examples of SaaS services provided by Oracle Corporation® include, without limitation, various services for human resources/capital management, customer relationship management (CRM), enterprise resource planning (ERP), supply chain management (SCM), enterprise performing management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporations include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 1002. Cloud infrastructure system 1002 then performs processing to provide the services requested in the customer's subscription order. Cloud infrastructure system 1002 may be configured to provide one or even multiple cloud services.

Cloud infrastructure system 1002 may provide the cloud services via different deployment models. In a public cloud model, cloud infrastructure system 1002 may be owned by a third-party cloud services provider and the cloud services are offered to any general public customer, where the customer can be an individual or an enterprise. In certain other embodiments, under a private cloud model, cloud infrastructure system 1002 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 1002 and the services provided may be shared by several organizations in a related community. Various other models such as hybrids of the above mentioned models may also be used.

Client computing devices 1004, 1006, and 1008 may be of different types (such as devices 902, 904, 906, and 908 depicted in FIG. 9) and may be capable of operating one or more client applications. A user may use a client device to interact with cloud infrastructure system 1002, such as to request a service provided by cloud infrastructure system 1002. For example, a user may use a client device to request data storage services described in this disclosure.

In some embodiments, the processing performed by cloud infrastructure system 1002 may include big data analysis. The analysis may include using, analyzing, and manipulating large data sets to detect and visualize various trends, behaviors, relationships, etc. within the data. This analysis may be performed by one or more processors, possibly processing the data in parallel, performing simulations using the data, and the like. The data used for this analysis may include structured data (e.g., data stored in a database or structured according to a structured model) and/or unstructured data (e.g., data blobs (binary large objects)).

As depicted in the embodiment in FIG. 10, cloud infrastructure system 1002 may include infrastructure resources 1030 that are utilized for facilitating the provision of various cloud services offered by cloud infrastructure system 1002. Infrastructure resources 1030 may include, for example, processing resources, storage or memory resources, networking resources, and the like.

In certain embodiments, to facilitate efficient provisioning of these resources for supporting the various cloud services provided by cloud infrastructure system 1002 for different customers, the resources may be bundled into sets of resources or resource modules (also referred to as "pods"). Each resource module or pod may comprise a pre-integrated and optimized combination of resources of one or more types. In certain embodiments, different pods may be provisioned for a databased service, a second set of pods, which may include a different combination of resources than a pod in the first set of pods, may be provisioned for Java service, and the like. For some services, the resources allocated for provisioning the services may be shared between the services.

Cloud infrastructure system 1002 may itself internally use services 1032 that are shared by different components of cloud infrastructure system 1002 and which facilitate the provisioning of services by cloud infrastructure system 1002. These internal shared services may include, without limitation, a security and identity service, an integration service, an enterprise repository service, an enterprise manager service, a virus scanning and white-list service, a high availability, backup and recovery service, service for enabling cloud support, an email service, a notification service, a file transfer service, and the like.

Cloud infrastructure system 1002 may comprise multiple subsystems. These subsystems may be implemented in software, or hardware, or combinations thereof. As depicted in FIG. 10, the subsystems may include a user interface subsystem 1012 that enables users or customers of cloud infrastructure system 1002 to interact with cloud infrastructure system 1002. User interface subsystem 1012 may include various different interfaces such as a web interface 1014, an online store interface 1016 where cloud services provided by cloud infrastructure system 1002 are advertised and are purchasable by a customer, and other interfaces 1018. For example, a customer may access the online store, browse cloud services offered by cloud infrastructure system 1002, and place a subscription order for one or more services offered by cloud infrastructure system 1002 that the customer wishes to subscribe to. The service request may include information identifying the customer and one or more services that the customer desires to subscribe to.

In certain embodiments, such as the embodiment depicted in FIG. 10, cloud infrastructure system 1002 may comprise an order management subsystem (OMS) 1020 that is configured to process the new order. As part of the processing, OMS 1020 may be configured to create an account for the customer, if not done already, receive billing and/or accounting information from the customer that is to be used for billing the customer for providing the requested service to the customer, verify the customer information, upon verification, book the order for the customer, and orchestrate various workflows to prepare the order for provisioning.

Once properly validated OMS 1020 may then invoke the order provisioning subsystem (OPS) 1024 that is configured to provision resources for the order including processing, memory, and networking resources. The provisioning may include allocating resources for the order and configuring the resources to facilitate the services requested by the customer order. The manner in which resources are provisioned for an order and the type of provision resources may depend on the type of cloud service that has been ordered by the customer. For example, according to one workflow, OPS 1024 may be configured to determine the particular cloud service being requested and identify a number of pods that may have been pre-configured for that particular cloud service. The number of pods that are allocated for an order may depend on the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

Cloud infrastructure system 1002 may send a response or notification 1044 to the requesting customer to indicate when the requested service is now ready for use. In some instances, information (e.g., a link) may be sent to the customer that enables the customer to start using and availing the benefits of the requested services.

Cloud infrastructure system 1002 may provide services to multiple customers. For each customer, cloud infrastructure system 1002 is responsible for managing information related to one or more subscription orders received from the customer, maintaining customer data related to the orders, and providing the requested services to the customer. Cloud infrastructure system 1002 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 1002 may provide services to multiple customers in parallel. Cloud infrastructure system 1002 may store information for these customers, including possibly proprietary information. In certain embodiments, cloud infrastructure system 1002 comprises an identity management subsystem (IMS) 1028 that is configured to manage customers information and provide the separation of the managed information such that information related to one customer is not accessible by another customer. IMS 1028 may be configured to provide various security-related services such as identity services, such as information access management, authentication and authorization services, services for managing customer identities and roles and related capabilities, and the like.

Figure 11:
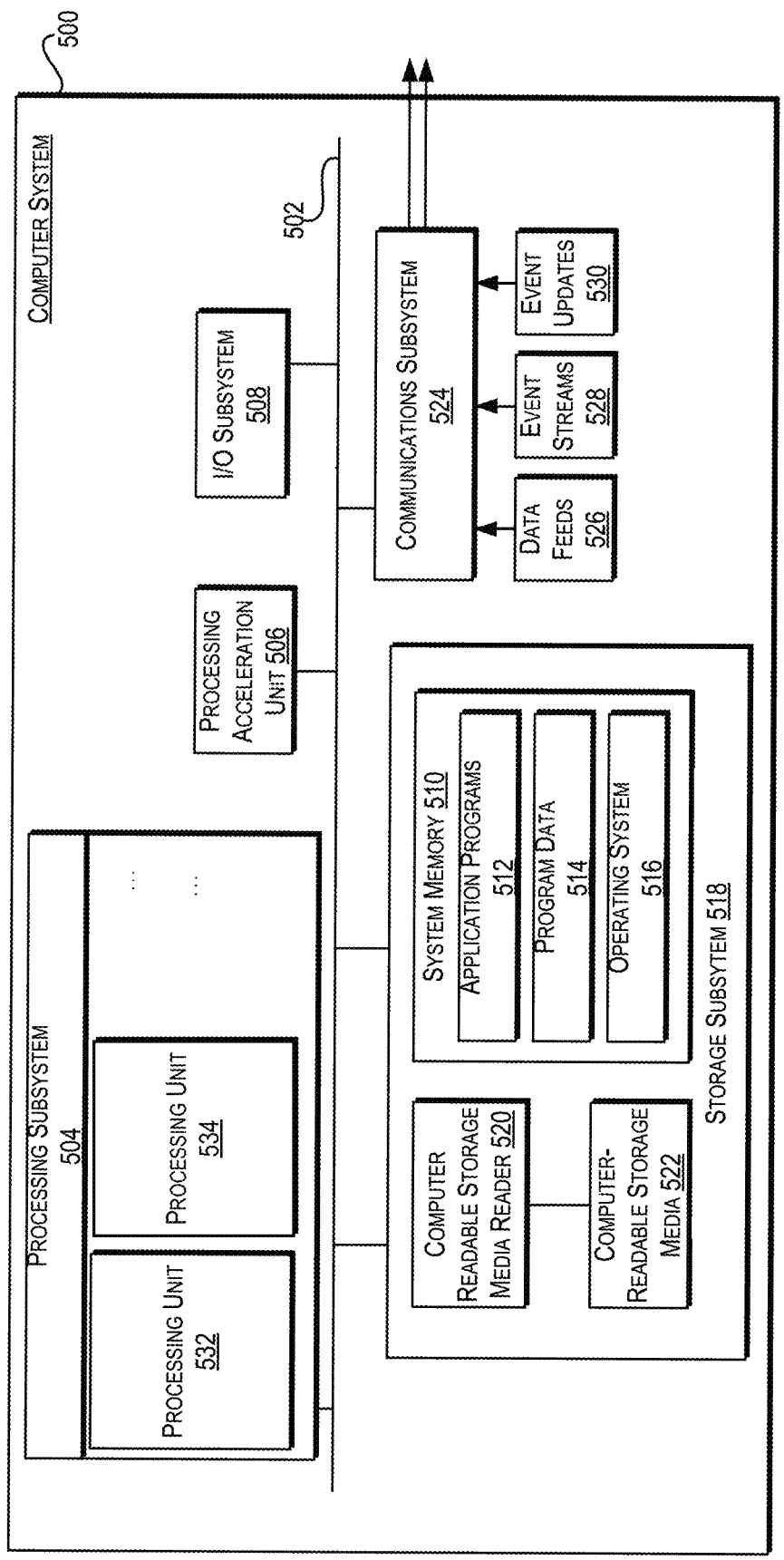
FIG. 11 illustrates an exemplary computer system 1100 that may be used to implement certain embodiments.

FIG. 11 illustrates an exemplary computer system 1100 that may be used to implement certain embodiments. For example, in some embodiments, computer system 1100 may be used to implement any of various servers and computer systems described above. As shown in FIG. 11, computer system 1100 includes various subsystems including a processing subsystem 1104 that communicates with a number of other subsystems via a bus subsystem 1102. These other subsystems may include a processing acceleration unit 1106, an I/O subsystem 1108, a storage subsystem 1118, and a communication subsystem 1124. Storage subsystem 1118 may include non-transitory computer-readable storage media including storage media 1122 and a system memory 1110.

Bus subsystem 1102 provides a mechanism for letting the various components and subsystems of computer system 1100 communicate with each other as intended. Although bus subsystem 1102 is shown schematically as a single bus, alternative embodiments of the bus subsystem may utilize multiple buses. Bus subsystem 1102 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, and Peripheral Component Interconnect (PCI) bus, which can be implemented as a Mezzanine bus manufactured to the IEEE P1386.1 standard, and the like.

Processing subsystem 1104 controls the operation of computer system 1100 and may comprise one or more processors, application specific integrated circuits (ASICs), or field programmable gate arrays (FPGAs). The processors may be single core or multicore processors. The processing resources of computer system 1100 can be organized into one or more processing units 1132, 1134, etc. A processing unit may include one or more processors, one or more cores from the same or different processors, a combination of cores and processors, or other combinations of cores and processors. In some embodiments, processing subsystem 1104 can include one or more special purpose co-processors such as graphics processors, digital signal processors (DSPs), or the like. In some embodiments, some or all of the processing units of processing subsystem 1104 can be implemented using customized circuits, such as ASICs or FPGAs.

In some embodiments, the processing units in processing subsystem 1104 can execute instructions stored in system memory 1110 or on computer-readable storage media 1122. In various embodiments, the processing units can execute a variety of programs or code instructions and can maintain multiple concurrently executing programs or processes. At any given time, some or all of the program code to be executed can be resident in system memory 1110 and/or on computer-readable storage media 1122 including potentially on one or more storage devices. Through suitable programming, processing subsystem 1104 can provide various functionalities described above. In instances where computer system 1100 is executing one or more virtual machines, one or more processing units may be allocated to each virtual machine.

In certain embodiments, a processing acceleration unit 1106 may optionally be provided for performing customized processing or for off-loading some of the processing performed by processing subsystem 1104 so as to accelerate the overall processing performed by computer system 1100.

I/O subsystem 1108 may include devices and mechanisms for inputting information to computer system 1100 and/or for outputting information from or via computer system 1100. In general, use of the term input device is intended to include all possible types of devices and mechanisms for inputting information to computer system 1100. User interface input devices may include, for example, a keyboard, pointing devices such as a mouse or trackball, a touchpad or touchscreen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., blinking while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments, and the like.

In general, use of the term output device is intended to include all possible types of devices and mechanisms for outputting information from computer system 1100 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/visual information such as monitors, printers, speakers, headphones, automotive navigation systems, plotters, voice output devices, and modems.

Storage subsystem 1118 provides a repository or data store for storing information and data that is used by computer system 1100. Storage subsystem 1118 provides a tangible non-transitory computer-readable storage medium for storing the basic programming and data constructs that provide the functionality of some embodiments. Storage subsystem 1118 may store software (e.g., programs, code modules, instructions) that when executed by processing subsystem 1104 provides the functionality described above. The software may be executed by one or more processing units of processing subsystem 1104. Storage subsystem 1118 may also provide a repository for storing data used in accordance with the teachings of this disclosure.

Storage subsystem 1118 may include one or more non-transitory memory devices, including volatile and non-volatile memory devices. As shown in FIG. 11, storage subsystem 1118 includes a system memory 1110 and a computer-readable storage media 1122. System memory 1110 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 1100, such as during start-up, may typically be stored in the ROM. The RAM typically contains data and/or program modules that are presently being operated and executed by processing subsystem 1104. In some implementations, system memory 1110 may include multiple different types of memory, such as static random access memory (SRAM), dynamic random access memory (DRAM), and the like.

By way of example, and not limitation, as depicted in FIG. 11, system memory 1110 may load application programs 1112 that are being executed, which may include various applications such as Web browsers, mid-tier applications, relational database management systems (RDBMS), etc., program data 1114, and an operating system 1116. By way of example, operating system 1116 may include various versions of Microsoft Windows®, Apple Macintosh®, and/or Linux operating systems, a variety of commercially available UNIX® or UNIX-like operating systems (including, without limitation, the variety of GNU/Linux operating systems, the Google Chrome® OS, and the like) and/or mobile operating systems such as iOS, Windows® Phone, Android® OS, Palm® OS operating systems, and others.

Computer-readable storage media 1122 may store programming and data constructs that provide the functionality of some embodiments. Computer-readable storage 1122 may provide storage of computer-readable instructions, data structures, program modules, and other data for computer system 1100. Software (programs, code modules, instructions) that, when executed by processing subsystem 1104 provides the functionality described above, may be stored in storage subsystem 1118. By way of example, computer-readable storage media 1122 may include non-volatile memory such as a hard disk drive, a magnetic disk drive, an optical disk drive such as a CD ROM, DVD, a Blu-Ray® disk, or other optical media. Computer-readable storage media 1122 may include, but is not limited to Zip® drives, flash memory cards, universal serial bus (USB) flash drives, secure digital (SD) cards, DVD disks, digital video tape, and the like. Computer-readable storage media 1122 may also include solid-state devices (SSD) based on non-volatile memory such as flash memory SSDs, enterprise flash drives, solid state ROM, and the like, SSDs based on volatile memories such as solid state RAM, dynamic RAM, static RAM, DRAM-based SSDs, magnetoresistive RAM (MRAM) SSDs, and hybrid SSDs that use a combination of DRAM and flash memory based SSDs.

In certain embodiments, storage subsystem 1118 may also include a computer-readable storage media reader 1120 that can further be connected to computer-readable storage media 1122. Reader 1120 may receive and be configured to read memory from a memory device such as a disk, a flash drive, etc.

In certain embodiments, computer system 1100 may support virtualization technologies, including but not limited to virtualization of processing and memory resources. For example, computer system 1100 may provide support for executing one or more virtual machines. In certain embodiments, computer system 1100 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 1100. Accordingly, multiple operating systems may potentially be run concurrently by computer system 1100.

Communications subsystem 1124 provides an interface to other computer systems and networks. Communications subsystem 1124 serves as an interface for receiving data from and transmitting data to other systems from computer system 1100. For example, communications subsystem 1124 may enable computer system 1100 to establish a communication channel to one or more client devices via the Internet for receiving and sending information from and to the client devices.

Communication subsystem 1124 may support both wired and/or wireless communication protocols. For example, in certain embodiments, communications subsystem 1124 may include radio frequency (RF) transceiver components for accessing wireless voice and/or data networks (e.g., using cellular telephone technology, advanced data network technology, such as 3G, 4G, or EDGE (enhanced data rates for global evolution), WiFi (IEEE 802.XX family standards, or other mobile communication technologies, or any combination thereof), global positioning system (GPS) receiver components, and/or other components. In some embodiments, communications subsystem 1124 can provide wired network connectivity (e.g., Ethernet) in addition to or instead of a wireless interface.

Communication subsystem 1124 can receive and transmit data in various forms. For example, in some embodiments, in addition to other forms, communication subsystem 1124 may receive input communications in the form of structured and/or unstructured data feeds 1126, event streams 1128, event updates 1130, and the like. For example, communications subsystem 1124 may be configured to receive (or send) data feeds 1126 in real-time from users of social media networks and/or other communication services such as Twitter® feeds, Facebook® updates, web feeds such as Rich Site Summary (RSS) feeds, and/or real-time updates from one or more third party information sources.

In certain embodiments, communications subsystem 1124 may be configured to receive data in the form of continuous data streams, which may include event streams 1128 of real-time events and/or event updates 1130, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1124 may also be configured to communicate data from computer system 1100 to other computer systems or networks. The data may be communicated in various different forms such as structured and/or unstructured data feeds 1126, event streams 1128, event updates 1130, and the like to one or more databases that may be in communication with one or more streaming data sources computers coupled to computer system 1100.

Computer system 1100 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 1100 depicted in FIG. 11 is intended only as a specific example. Many other configurations having more or fewer components than the system depicted in FIG. 11 are possible.

Although specific embodiments have been described, various modifications, alterations, alternative constructions, and equivalents are possible. Embodiments are not restricted to operation within certain specific data processing environments, but are free to operate within a plurality of data processing environments. Additionally, although certain embodiments have been described using a particular series of transactions and steps, this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described embodiments may be used individually or jointly.

Further, while certain embodiments have been described using a particular combination of hardware and software, it should be recognized that other combinations of hardware and software are also possible. Certain embodiments may be implemented only in hardware, or only in software, or using combinations thereof. The various processes described herein can be implemented on the same processor or different processors in any combination.

Where devices, systems, components, or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on non-transitory memory medium, or any combination thereof. Processes can communicate using a variety of techniques including but not limited to conventional techniques for inter-process communications, and different parts of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments provides an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus although specific embodiments have been described, these are not intended to be limiting. Various modifications and equivalents are within the scope of the following claims.

What is claimed is:

1. A computer-implemented method comprising:
   receiving, from a client system, client data that includes information corresponding to a plurality of users and a plurality of user devices;
   identifying a privacy protection protocol of a plurality of privacy protection protocols that apply to a user device of the plurality of user devices, wherein identifying the privacy protection protocol includes:
      receiving input from the user device via an interface associated with the user device, for each of a plurality of data-protection protocols, a predicted data protection metric and a predicted performance metric of a machine-learning model, wherein each of the plurality of protection protocols includes a plurality of privacy protection policy;
   identifying a particular subset of the client data as being personally identifiable information (PII) data, wherein the particular subset includes a set of PII attributes;
   splitting the PII attributes into at least one of multiple predefined categories based on a format of a data field in the PII attributes, wherein the multiple predefined categories include numeric data and categorical data;
   processing PII data corresponding to the categorical data and numerical data, wherein the processing includes encrypting the categorical data and adding noise to the numeric data;
   combining the processed PII data corresponding to the multiple-predefined categories with non-PII data to create processed client data;
   determining an amount of noise based on the privacy protection protocol;
   adding the amount of noise to the numeric data to produce protected PII training data; and
   training the machine-learning model using the protected PII training data.

2. The computer-implemented method of claim 1, wherein identifying the privacy protection protocols includes:
   determining one or more geographical regions that correspond to the client system; and
   retrieving one or more data-protection restrictions that correspond to the one or more geographical regions.

3. The computer-implemented method of claim 1, wherein identifying the privacy protection protocols includes:
   receiving other input from the client system that identifies degree to which data-protection is to be prioritized as compared to a performance metric of the machine-learning model.

4. The computer-implemented method of claim 1, wherein the multiple predefined categories comprises categorical text data, categorical numeric data, high cardinality text, continuous numeric data, or text.

5. The computer-implemented method of claim 1, wherein the processing further includes using another ML model, using a rules-based algorithm, or implementing a pattern-recognition technique.

6. A system comprising:
one or more data processors; and
a non-transitory computer-readable storage medium containing instructions which, when executed on the one or more data processors, cause the one or more data processors to perform operations comprising:
receiving, from a client system, client data that includes information corresponding to a plurality of users and a plurality of user devices;
identifying a privacy protection protocol of a plurality of privacy protection protocols that apply to a user device of the plurality of user devices, wherein identifying the privacy protection protocol includes:
receiving input from the user device via an interface associated with the user device, for each of a plurality of data-protection protocols, a predicted data protection metric and a predicted performance metric of a machine-learning model, wherein each of the plurality of protection protocols includes a plurality of privacy protection policy;
identifying a particular subset of the client data as being personally identifiable information (PII) data, wherein the particular subset includes a set of PII attributes;
splitting the PII attributes into at least one of multiple predefined categories based on a format of a data field in the PII attributes, wherein the multiple predefined categories include numeric data and categorical data;
processing PII data corresponding to the categorical data and numerical data, wherein the processing includes encrypting the categorical data and adding noise to the numeric data;
combining the processed PII data corresponding to the multiple predefined categories with non-PII data to create processed client data;
determining an amount of noise based on the privacy protection protocol;
adding the amount of noise to the numeric data to produce protected PII training data; and
training the machine-learning model using the protected PII training data.

7. The system of claim 6, wherein identifying the privacy protection protocols includes:
determining one or more geographical regions that correspond to the client system; and
retrieving one or more data-protection restrictions that correspond to the one or more geographical regions.

8. The system of claim 6, wherein identifying the privacy protection protocols includes:
receiving other input from the client system that identifies degree to which data-protection is to be prioritized as compared to a performance metric of the machine-learning model.

9. The system of claim 6, wherein the multiple predefined categories comprises categorical text data, categorical numeric data, high cardinality text, continuous numeric data, or text.

10. The system of claim 6, wherein the processing further includes using another ML model, using a rules-based algorithm, or implementing a pattern-recognition technique.

11. A computer program product tangibly embodied in a non-transitory computer-readable storage medium, including instructions configured to cause one or more data processors to perform operations comprising:
receiving, from a client system, client data that includes information corresponding to a plurality of users and a plurality of user devices;
identifying a privacy protection protocol of a plurality of privacy protection protocols that apply to a user device of the plurality of user devices, wherein identifying the privacy protection protocol includes:
receiving input from the user device via an interface associated with the user device, for each of a plurality of data-protection protocols, a predicted data protection metric and a predicted performance metric of a machine-learning model, wherein each of the plurality of protection protocols includes a plurality of privacy protection policy;
identifying a particular subset of the client data as being personally identifiable information (PII) data, wherein the particular subset includes a set of PII attributes;
splitting the PII attributes into at least one of multiple predefined categories based on a format of a data field in the PII attributes, wherein the multiple predefined categories include numeric data and categorical data;
processing PII data corresponding to the categorical data and numerical data, wherein the processing includes encrypting the categorical data and adding noise to the numeric data;
combining the processed PII data corresponding to the predefined categories with non-PII data to create processed client data;
determining an amount of noise based on the privacy protection protocol;
adding the amount of noise to the numeric data to produce protected PII training data; and
training the machine-learning model using the protected PII training data.

12. The computer program product of claim 11, wherein identifying the privacy protection protocols includes:
determining one or more geographical regions that correspond to the client system; and
retrieving one or more data-protection restrictions that correspond to the one or more geographical regions.

13. The computer program product of claim 11, wherein identifying the privacy protection protocols includes:
receiving other input from the client system that identifies degree to which data-protection is to be prioritized as compared to a performance metric of the machine-learning model.

14. The computer program product of claim 11, wherein the multiple predefined categories comprises categorical text data, categorical numeric data, high cardinality text, continuous numeric data, or text.

15. The computer program product of claim 11, wherein the processing techniques comprises using another ML model, using a rules-based algorithm, or implementing a pattern-recognition technique.

* * * * *

UNITED STATES PATENT AND TRADEMARK OFFICE
CERTIFICATE OF CORRECTION

PATENT NO. : 12,314,433 B2  
APPLICATION NO. : 17/932938  
DATED : May 27, 2025  
INVENTOR(S) : Madhavan et al.

Page 1 of 1

It is certified that error appears in the above-identified patent and that said Letters Patent is hereby corrected as shown below:

On the Title Page

Column 1, item (72) under inventors, Line 4, delete "Redwood Shores, CA (US);" and insert -- Bengaluru (IN); --, therefor.

In the Specification

In Column 2, Line 67, delete "embodiments" and insert -- embodiments. --, therefor.

In Column 8, Line 54, delete "For" and insert -- for --, therefor.

In Column 12, Line 22, delete "Internet" and insert -- Internetwork --, therefor.

In the Claims

In Column 23, Line 46, in Claim 6, before "predefined" delete "multiple".

Signed and Sealed this  
Twelfth Day of August, 2025

Coke Morgan Stewart  
*Acting Director of the United States Patent and Trademark Office*